UNITED STATES PATENT OFFICE.

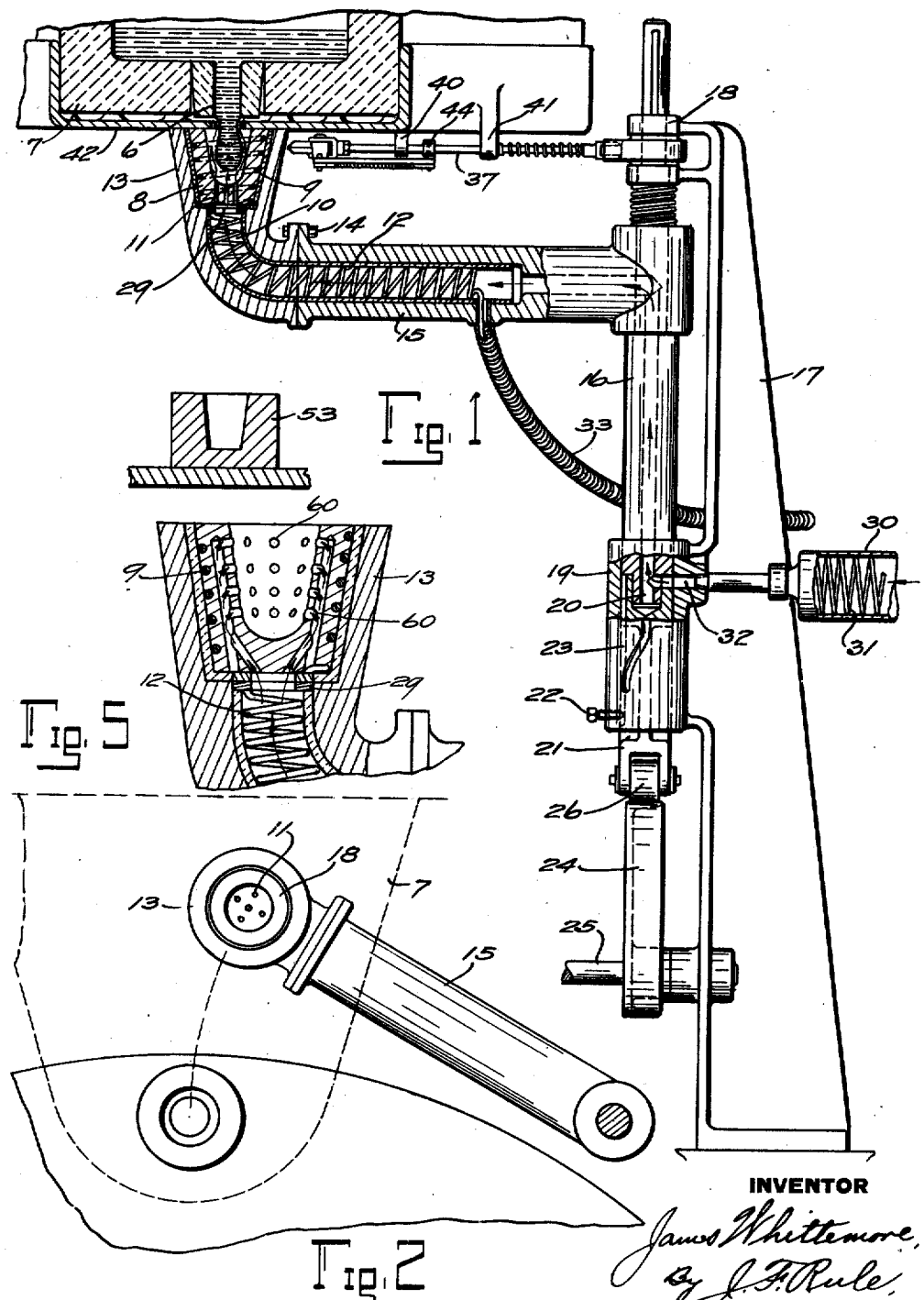

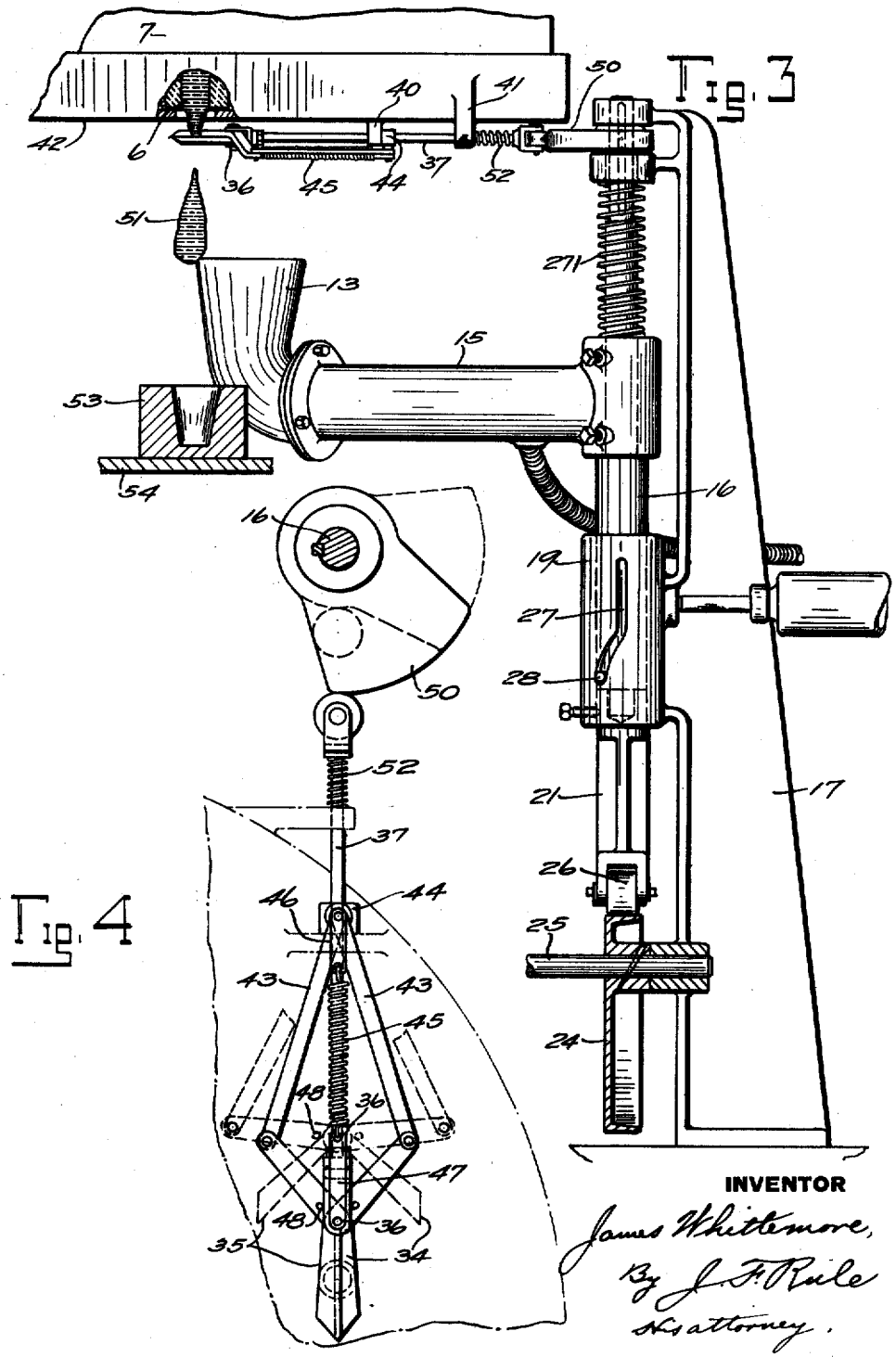

JAMES WHITTEMORE, OF DETROIT, MICHIGAN, ASSIGNOR TO THE OWENS BOTTLE MACHINE COMPANY, OF TOLEDO, OHIO, A CORPORATION OF OHIO.

FLOWING MOLTEN GLASS.

1,310,225.   Specification of Letters Patent.   Patented July 15, 1919.

Application filed December 26, 1918. Serial No. 268,256.

*To all whom it may concern:*

Be it known that I, JAMES WHITTEMORE, a citizen of the United States, residing at Detroit, in the county of Wayne and State of Michigan, have invented new and useful Improvements in Flowing Molten Glass, of which the following is a specification.

My invention relates to improvements in that method of segregating molten glass into individual mold charges or gobs which consists in periodically severing the glass by a mechanical shear as it is discharged from the furnace or receptacle in the form of a column or stream.

The primary object of my invention is to provide improved means for re-melting the severed end of the glass which has been chilled by the cutter, and further to heat and form the accumulating gobs of glass into suitable condition for entering the mold.

In practising my invention I provide a heating cup which, after each charge of glass has been severed, is brought into position beneath the flow opening to receive the oncoming glass. The cup is provided with an inner lining of refractory material, which is intensely heated by an electric coil, the radiant heat serving to reheat the cut end of the glass which has been chilled by the knife, thereby eliminating the shear marks. The entire surface of the oncoming stream or column of glass is heated or prevented from cooling as it emerges from the furnace. The glass is prevented from actual contact with the walls of the cup by means of air pressure supplied through perforations in the cup. The air is heated preferably by an electric coil before it enters the cup. Suitable mechanism is provided for automatically dropping the cup away from the glass and swinging it to one side after the glass has been reheated. The cutter then operates to sever the charge, allowing it to drop into the mold.

Other features and advantages of the invention will appear hereinafter.

In the accompanying drawings:

Figure 1 is a part sectional elevation of an apparatus embodying the principles of my invention.

Fig. 2 is a sectional plan showing the cup swung away from the line of flow.

Fig. 3 is a view similar to Fig. 1, but with the parts in the position assumed just after a gob has been severed.

Fig. 4 is an under side view of the cutting mechanism.

Fig. 5 is a view showing a modified construction in which the air is admitted through the side walls of the cup.

The molten glass is discharged through a flow opening 6 in the bottom of a receptacle 7, which may be a boot or extension on a continuous melting furnace. The glass flows in the form of a sluggish stream into a forming and heating cup 8, which is periodically moved into position directly beneath the flow opening. This cup is lined with, or made of material refractory to heat, such as graphite, and is heated to a high temperature by an electric heating coil 9. The glass as it enters the cup is thus surrounded by an intensely heated solid from which heat is radiated to the glass. Direct contact of the glass with the walls of the cup is prevented by the pressure of air or other gas within the cup. This air is supplied through a passageway 10 communicating with the interior of the cup through a series of small openings 11 arranged to distribute the air. The air is preferably heated before it enters the cup by means of a heating coil 12 within the passageway 10.

The cup 8 is seated in a holder 13 and may be quickly removed by simply lifting it out of the holder for repairs or to be replaced by a different cup. The holder 13 is removably attached as by means of bolts 14 to a horizontal rock arm 15 extending from a vertical rock shaft 16. The shaft 16 is mounted for vertical and rotative movement in a standard 17 provided with upper and lower bearing sleeves 18 and 19 respectively. The lower end 20 of the shaft 16 is journaled in an non-rotating section 21 movable vertically with the shaft 16 and held against rotation by a pin 22 engaging the vertical groove 23 in the member 21. Vertical movement is imparted to the shaft 16 by a cam 24 on a continuously rotating shaft 25, the member 21 having a roll 26 running on said cam.

The rotative movement of the shaft 16 with its cup carrying arm is controlled by a cam slot 27 (Fig. 3) in the stationary sleeve 19, in which slot runs a pin 28 on the shaft 16. As shown in Fig. 3, the rock shaft is in its lowered position with the guide pin 28 at the bottom of its slot and the cup carrying arm is lowered and swung to one side of the flow opening. As the rock shaft is lifted by the cam 24 it is at the same time rocked by the inclined portion of the cam slot to swing the cup beneath the flow opening. The cup is brought to a position directly beneath the opening as the pin reaches the vertical portion of the slot, so that the continued upward movement of the cup is in a vertical direction. The downward movement of the forming cup is effected by gravity, assisted by the coil spring 271. The cam 24 is so shaped that the cup can move rapidly downward and to one side out of the path of the glass.

The air which is supplied under pressure to the heating cup is preferably heated before it reaches the passageway 10. For this purpose a heating chamber 30 is provided with an electrical heating coil 31. The air passes through this pre-heater and a port 32 into the hollow shaft 16 and from thence into the arm 15, as indicated by the arrows. The capacity of the pre-heater 30 is such that the movement of the air therethrough is slow, so that it may be heated to a high degree, whereas its passage through the rock shaft 16 is comparatively rapid. The electric current may be conducted through a cable 33 to the coils 12 and 9. These coils may be electrically connected through contact rings 29 attached to the respective coils, the rings being brought together by placing the cup within its holder 13.

The cutting mechanism comprises a pair of blades 34, 35 pivoted at 36 to an actuating rod 37 mounted for horizontal movement in the direction of its length. The mounting for this rod may comprise lugs 40 and 41 on a metal plate 42, the latter forming a support for the boot 7. Links 43 connect the shanks of the shear blades with a block 44 slidable on the rod 37. A coil spring 45 is connected through links 46 and 47 to the block 44 and the pivot 36 respectively. This spring normally holds the shears in the open position indicated by broken lines in Fig. 4. Stop pins 48 on the shanks of the blades limit the opening movement of the shears by engaging the rear surfaces of the blades as shown.

The rod 37 is advanced to actuate the shears by means of a cam 50 keyed to the rock shaft 16. As said shaft is rocked to swing the heating cup to one side, the cam 50 moves the rod 37 forward and actuates the shears to sever a gob 51. The shears are carried bodily forward with the rod until the block 44 strikes the stationary lug 40. The continued forward movement of said rod then moves the shear blades from the dotted line to the full line position, Fig. 4, thereby closing the blades and shearing the glass. The stop pins 48, as shown, serve to limit the closing as well as the opening movement of the blades. When the shaft 16 is rocked in the reverse direction to return the heating cup, the movements of the shears are reversed, the blades being first separated and then bodily withdrawn. A spring 52 retracts the rod 37 as the cam 50 returns.

Each gob 51 as it is severed drops into a mold 53 directly beneath the flow opening. A series of molds may be provided, as usual, mounted on a mold table 54 rotated step by step to bring the molds successively into receiving position. The driving shaft 25 may be geared to the mold carriage to operate in synchronism therewith, the shaft 25 being given one complete rotation for each step movement of the mold carriage, so that each mold receives a charge of glass.

Fig. 5 shows a modified construction wherein the air is admitted to the heating cup through side openings 60, thereby permitting the radiant heat to be applied more effectively to the cut end of the glass.

The operation may be summarized as follows:

When a gob has been severed, as indicated in Fig. 3, the cutter is immediately withdrawn and the glass exudes from the opening 6 in the form of a heavy stream or column. At the same time the heating cup swings beneath the flow opening and up into engagement with the plate 42. The radiant heat from the inner surface of the cup quickly softens or melts the cut end of the glass which has been chilled by the comparatively cold cutter. The entire surface of the glass within the cup is uniformly heated and brought to the best condition for entering the mold. The movement of the heating cup to the Fig. 1 position automatically opens the port 32 and thereby supplies a circulation of air under pressure into and through the cup. This pressure is preferably sufficient to prevent actual contact of the glass with the heated walls of the cup, as well as to retard or stop the flow of glass from the furnace, thereby giving sufficient time for heating the gob. The heating cup is then moved rapidly downward and to one side, this movement being accompanied or immediately followed by the operation of the shears which sever the gob and permit it to drop into the mold without being exposed long to the outside air. The swinging movement of the heating cup out of the path of the glass, automatically cuts off the air supply at the port 32. The air pressure may be varied to suit varying conditions. In some instances air pressure may not be needed, the heating cup being withdrawn before the glass has had opportunity to come in contact with it. The amount of air passing through the heating cup will depend in a measure on the closeness with which the cup fits the bottom of the furnace boot. The passage for the escape of air may be confined to the opening in the plate 42 through which the glass enters the cup. The pressure is thus localized and, therefore, more effective in retarding the glass. The heating cup is shaped to correspond with the desired shape of gob and serves in a measure as shaping means for the gob.

Modifications may be resorted to within the spirit and scope of my invention.

What I claim is:

1. The combination with a receptacle for molten glass having a discharge orifice, of a mechanical shear for periodically severing the discharged glass, and means to supply radiant heat to the surface chilled by said cutter, and thereby reheat or melt the chilled glass.

2. The combination of a receptacle for molten glass, means to discharge the glass therefrom, a shear operable periodically to sever charges of glass, and an electrically heated element arranged to direct radiant heat against the cut surface of the glass and thereby remelt the shear mark.

3. The combination with a receptacle for molten glass from which a stream of glass is discharged, of means to supply radiant heat to the surface of the glass after it leaves the receptacle, of sufficient intensity to raise the surface temperature of the glass, and means to sever the charges of glass after said heating.

4. The combination with a receptacle for molten glass having a discharge outlet, of a heating cup movable into position to receive the glass as it flows from said outlet, and electrical means for heating said cup and thereby supplying radiant heat of sufficient intensity to reheat the surface of the glass therein.

5. The combination with a receptacle for molten glass having a discharge outlet, of a heating cup movable into position to receive the glass as it flows from said outlet, electrical means for heating said cup and thereby supplying radiant heat of sufficient intensity to reheat the surface of the glass therein, automatic means to withdraw said cup, and a cutter operable to sever the glass after the cup is withdrawn.

6. The combination with a receptacle for molten glass having a discharge outlet, of a heating cup movable into position to receive the glass as it flows from said outlet, electrical means for heating said cup and thereby supplying radiant heat of sufficient intensity to reheat the surface of the glass therein, and means to supply gas under pressure within said cup to thereby prevent contact of the glass with the cup.

7. The combination with a receptacle for molten glass having a discharge outlet, of a heating cup movable into position to receive the glass as it flows from said outlet, electrical means for heating said cup and thereby supplying radiant heat of sufficient intensity to reheat the surface of the glass therein, means to supply gas under pressure within said cup to thereby prevent contact of the glass with the cup, and means to heat said gas before it enters the cup.

8. The combination with a receptacle for molten glass provided with an opening in the bottom thereof through which the glass is discharged, of a heating cup beneath said opening to receive the glass, an electric heating coil by which the inner walls of the cup are heated and radiate heat against the glass, and means to periodically withdraw said cup and sever the glass.

9. The combination with a receptacle for molten glass provided with an opening in the bottom thereof through which the glass is discharged, of a heating cup beneath said opening to receive the glass, an electric heating coil by which the inner walls of the cup are heated and radiate heat against the glass, means to periodically withdraw said cup and sever the glass, and means to supply heated air under pressure to said cup and thereby prevent contact of the glass with the walls of the cup.

10. The combination with a receptacle for molten glass provided with a flow opening in the bottom thereof, of a vertical rock shaft, an arm carried thereby, a heating cup on said arm beneath the flow opening to receive the glass, an electric coil for heating the interior walls of said cup, and means for moving said shaft downward and rotating it to move the cup downwardly and laterally out of the path of the glass.

11. The combination with a receptacle for molten glass provided with a flow opening in the bottom thereof, of a vertical rock shaft, an arm carried thereby, a heating cup on said arm beneath the flow opening to receive the glass, an electric coil for heating the interior walls of said cup, means for moving said shaft downward and rotating it to move the cup downwardly and laterally out of the path of the glass, means for supplying air under pressure to said cup, and automatic means for cutting off the air supply as the cup moves away from the flow opening.

12. The combination with a receptacle for molten glass provided with a flow opening in the bottom thereof, of a vertical rock shaft, an arm carried thereby, a heating cup on said arm beneath the flow opening to receive the glass, an electric coil for heating the interior walls of said cup, means for moving said shaft downward and rotating it to move the cup downwardly and laterally out of the path of the glass, a cutter, and a cam actuated by said shaft to operate the cutter when said cup is withdrawn and sever the glass.

13. The combination with means to supply a flow of molten glass, of a rock shaft, an arm carried thereby, a heater carried by said arm, means to impart a combined endwise and rocking movement to said shaft to thereby move the heater into and out of operative relation to the glass, a shear, and a cam on the rock shaft to actuate the shear.

14. The combination with a receptacle for molten glass having a discharge orifice, of a heating cup, means to move said cup into engagement with said receptacle and surrounding said orifice, whereby a closed chamber is provided into which the glass flows, and means located externally of the cup cavity to heat the inner walls of the cup to a higher temperature than the glass therein.

15. The combination with a receptacle for molten glass having a discharge orifice, of a heating cup, means to move said cup into engagement with said receptacle and surrounding said orifice, whereby a closed chamber is provided into which the glass flows, means located externally of the cup cavity to heat the inner walls of the cup to a higher temperature than the glass therein, means to supply gas under pressure to the cup cavity and thereby prevent contact of the glass with the walls of the cup, and means to periodically withdraw the cup and sever the glass.

16. The combination with means for flowing molten glass, of a mechanical shear, means to periodically operate the shear to sever the glass, a graphite heater, means to electrically heat said heater, and means to bring said heater into position after each cutting operation to remelt the cut end of the glass by the radiant heat from said graphite.

17. The method which consists in flowing molten glass, periodically severing the glass with a mechanical shear, and remelting the chilled surface by radiant heat from a solid substance out of contact with the glass.

Signed at Detroit, in the county of Wayne, and State of Michigan, this 18th day of December, 1918.

JAMES WHITTEMORE.

Copies of this patent may be obtained for five cents each, by addressing the "Commissioner of Patents, Washington, D. C."